Dec. 23, 1969   R. Q. ARMINGTON ETAL   3,485,389
APPARATUS FOR PRODUCING CONCURRENT MOVEMENT OF AN
ARTICLE CARRIER IN A WAREHOUSE SYSTEM
Filed June 7, 1966   8 Sheets-Sheet 6

FIG.10

INVENTORS
RAYMOND Q. ARMINGTON
WAYNE G. ATWATER
BY
Baldwin, Doran & Egan
ATTORNEYS

INVENTORS
RAYMOND Q. ARMINGTON
WAYNE G. ATWATER
BY
Baldwin, Doran & Egan
ATTORNEYS

United States Patent Office 3,485,389
Patented Dec. 23, 1969

3,485,389
APPARATUS FOR PRODUCING CONCURRENT MOVEMENT OF AN ARTICLE CARRIER IN A WAREHOUSE SYSTEM
Raymond Q. Armington and Wayne G. Atwater, Willoughby, Ohio, assignors to The Triax Company, Cleveland, Ohio, a corporation of Ohio
Filed June 7, 1966, Ser. No. 555,820
Int. Cl. E04h 6/00
U.S. Cl. 214—16.4                    10 Claims

ABSTRACT OF THE DISCLOSURE

A warehousing system comprising vertically and horizontally oriented storage means and a powered load carrier movable in a travel zone alongside the storage means with the load carrier including a carriage supported on the storage means and a vertically elongated mast structure extending vertically from the carriage and providing for vertical movement of an elevator. The elevator has extractor means thereon for depositing loads into and removing loads from the storage means. Aligning means are provided on the load carrier for causing concurrent horizontal movement of the elongated mast structure with movement of the carriage to maintain vertical alignment of the load carrrier with the storage means thus ensuring that the extractor means will be in proper position with respect to the vertically oriented storage means for inserting and removing loads from a selected storage means.

---

This invention relates to warehousing systems of the type having a storage frame comprising vertically and horizontally arranged storage openings or bins and a mechanized load carrier movable generally horizontally and vertically alongside the storage frame, for selectively transporting a load into or picking up a load from the selected bin of the storage frame. The load carrier may comprise a horizontally movable conveyor frame which travels alongside the storage frame and provides vertical track means for an elevator capable of delivering loads to different levels in the storage frame. The elevator in turn may carry a laterally extensible extractor for inserting loads into the storage bins and returning loads therefrom. A warehousing system of the general type to which the present invention may be applied, but by no means the only type, is disclosed in assignee's copending U.S. patent application, Ser. No. 418,048, entitled Electrical Control Circuit for an Automatic Warehousing System, filed in the name of Sanford Saul, Dec. 14, 1964 and now U.S. Patent No. 3,402,835.

As such warehousing systems become larger with resultant increases in the height of the storage frame structure and thus the height of the load carrier structure, the problem of maintaining rigidity in the load carrier which is of a much greater height than its width and breadth, and of maintaining alignment between the load carrier and the selected storage bin in the handling cycle of the load carrier, becomes more complex and difficult. Good alignment between the load carrier and the storage frame is necessary so that the extractor will be in proper position with respect to the storage frame, for inserting or removing a load from the selected storage bin, at each load handling position.

The present invention provides a novel load carrier structure embodying means for maintaining the rigidity and the alignment of the load carrier structure with respect to the load supporting storage frame, so that the depositing or removal of a load by the load carrier from the storage frame is materially enhanced. This embodiment of automatic warehousing system is particularly advantageous in heights of approximately 25 to 60 feet or more.

Accordingly, an object of the invention is to provide a novel warehousing system.

A further object of the invention is to provide a warehousing system having a powered load carrier for depositing and/or removing a load from a storage frame in the system, and wherein the load carrier construction is of elongated upright configuration embodying means for materially rigidifying the load carrier against flexure.

A further object of the invention is to provide a load carrier construction of the aforementioned type which includes power means for moving the load carrier horizontally with respect to the storage frame, and with means coacting with the load carrier and the storage frame, and applied at a plurality of vertically spaced locations along said load carrier, so that the latter is maintained in true vertical alignment throughout its height with the storage frame.

A still further object of the invention is to provide an automatic warehousing system of the above-mentioned type wherein drive means concurrently activates the load carrier at spaced points along its height, and comprises toothed racks secured to the storage frame, and gear means on the load carrier coacting with said racks, with said gear means being operatively coupled to one another by means of generally vertically extending shaft means, so that rotation of one of the gear means due to horizontal movement of the load carrier causes rotation of the shaft means and thus rotation of the other gear means concurrently with rotation of the first mentioned gear means.

A further object of the invention is to provide an automatic warehousing system in accordance with the above and wherein the rigidifying means comprises truss means coacting with the mast structure of the load carrier, with such truss means being so constructed and arranged that it does not interfere with movement of the elevator and associated extractor for the full height of the load carrier, nor with the lateral movement of the extractor into and from the selected storage bin at each load handling position.

A still further object of the invention is to provide a novel load carrier construction which is of relatively light weight construction, but which is highly rigid with respect to flexure stress in both vertical and horizontal planes.

Other objects and advantages of the invention will be apparent from the following description taken in conjunction with the accompanying drawings wherein:

FIGURE 11 is a generally diagrammatic, fragmentary, side elevational view of the warehousing system of FIGURE 10;

Referring now again to the drawings and in particular to FIGURES 1 to 9 thereof, the automatic warehousing system in the embodiment illustrated may comprise a storage frame 10 having parallel storage bay sections 12 and 14, defining between them a travel zone or aisle 16, so as to permit a motorized load carrier, indicated generally at 18, to be moved along the aisle or travel zone 16, and to insert and/or withdraw a load or article from the storage bins 19 formed by storage sections 12 and 14.

As shown, each storage bay section may be constructed of a plurality of vertically extending posts 20, 21 spaced apart by a plurality of generally horizontally extending load supporting members 22, defining a plurality of the storage bins 19. Stringers 23 may be provided tying each storage frame section together, and stringers 23a may be provided across the tops of the storage sections 12 and 14 tying the latter together into a generally rigid arrangement.

Figure 1:
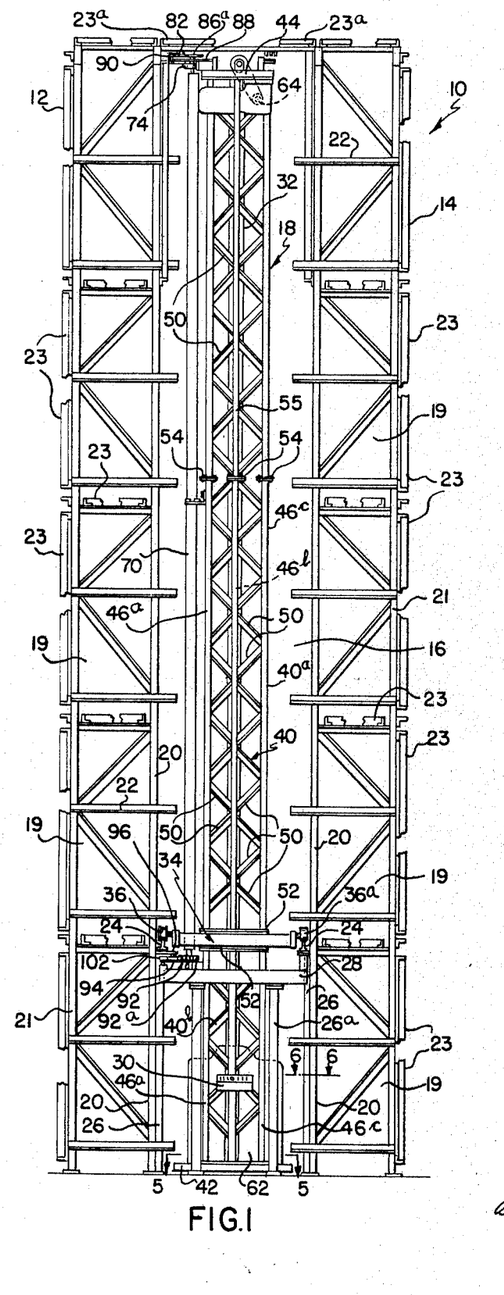
FIGURE 1 is a generally diagrammatic end elevational view of an automatic warehousing system embodying the instant invention.

As can be best seen in FIGURE 1, the aisle sides of the storage sections 12 and 14 may be provided with a pair of generally horizontally extending rails 24 defining tracks providing for supporting the load carrier 18 as it is moved therealong within the aisle or travel zone 16. Each of the aisle posts 20 is preferably provided with an auxiliary support post 26 suitably attached to the confronting aisle post and supporting the associated track member 24. Rails 24 preferably extend outwardly of the storage sections as at 24a (FIGURE 2), for positioning of the load carrier in front of the storage sections at a pick-up and discharge station or stations, from which position the load carrier starts its movement into the aisle to deposit or pick-up loads in the storage bay sections 12 and 14. Rail portions 24a may be supported at their distal ends by support posts 26a and cross structure 28, which apply the weight force due to the load carrier, directly to the floor F. Posts 26a are spaced far enough apart to receive the control console 30 on the load carrier therebetween, in the outwardmost position of the load carrier. Console 30 is adapted to mount a plurality of manually operable control means adapted for actuation by the operator, to control the movement of the load carrier from the pick-up and discharge station to selected load handling positions in the storage frame and return, and as described in the aforementioned copending patent application Ser. No. 418,048.

Load carrier 18 may comprise vertical mast structure providing a pair of spaced vertically extending track members 32, with the mast structure being secured to a generally rectangular (in the embodiment illustrated) carriage frame 34. Carriage frame 34 is adapted to bridge the distance across the aisle 16 and has traction means such as wheels 36, 36a, at the sides thereof, which are disposed in rolling engagement with the laterally spaced rail members 24, thus supporting the load carrier 18 on the rails 24 for horizontal movement alongside the storage bays.

Figure 4:
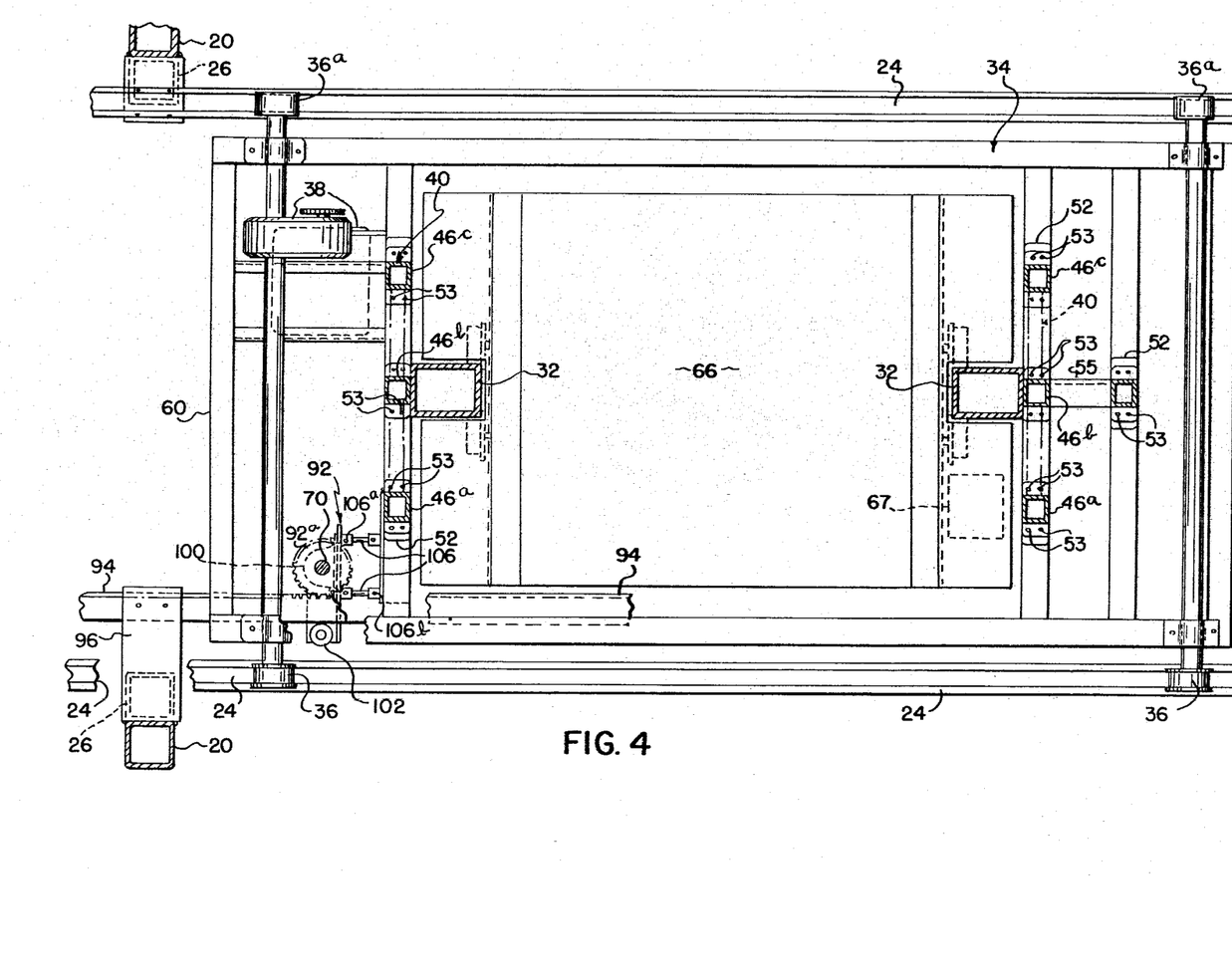
FIGURE 4 is a horizontal sectional view taken generally along the plane of line 4—4 of FIGURE 2 looking in the direction of the arrows.
Figure 5:
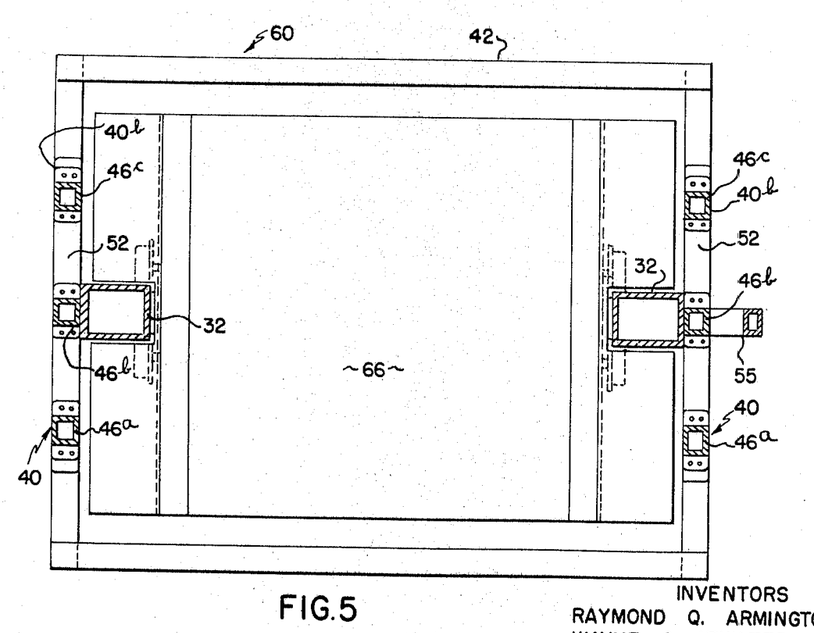
FIGURE 5 is a view taken generally along the plane of line 5—5 of FIGURE 1 looking in the direction of the arrows.
Figure 6:
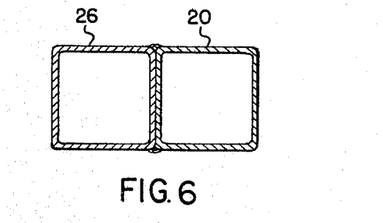
FIGURE 6 is a view taken generally along the plane of line 6—6 of FIGURE 1 looking in the direction of the arrows.
Figure 7:
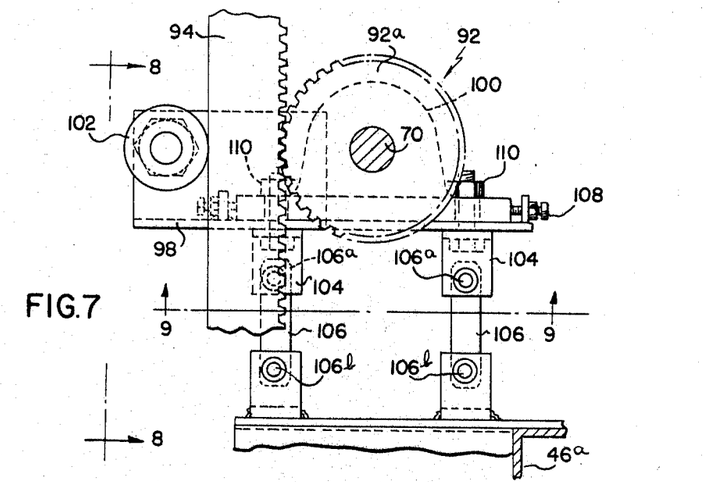
FIGURE 7 is an enlarged top plan view of the gear and rack means coacting between the load carrier and the storage frame adjacent the horizontally movable carriage of the load carrier, for maintaining the load carrier in vertical alignment with the storage frame, with such gear means comprising a floating arrangement providing for movement of the gear means in a generally horizontal plane and with respect to the load carrier.
Figure 8:
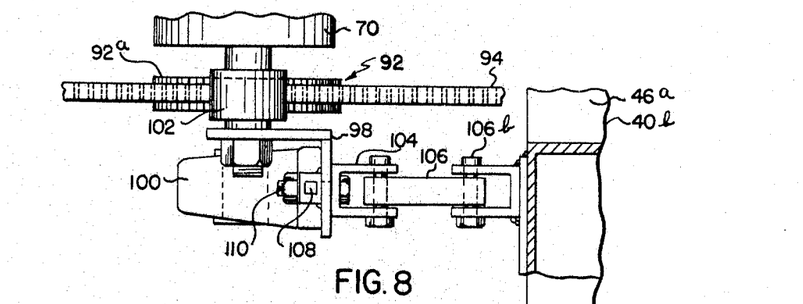
FIGURE 8 is a side elevational view of the gear and rack means of FIGURE 7 taken generally along the plane of line 8—8 of FIGURE 7.
Figure 9:
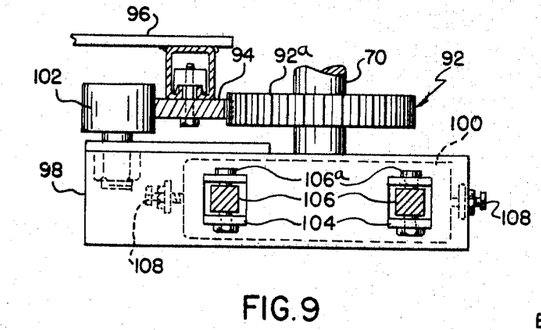
FIGURE 9 is a sectional view of the floating gear arrangement of FIGURE 7 taken generally along the plane of line 9—9 of FIGURE 7, looking in the direction of the arrows.

Wheels 36 are preferably provided with lateral flanges as shown for instance in FIGURES 1 and 4, for guiding the movement of the wheels along the associated rail 24. Wheels 36a are preferably non-flanged, and thus are disposed in non-guided relation with the associated rail member.

Suitable power means 38 (FIGURE 4) such as an electric motor and coupled geared transmission, may be operably coupled to the wheels, for causing horizontal movement of the load carrier with respect to the storage sections 12 and 14.

Figure 2:
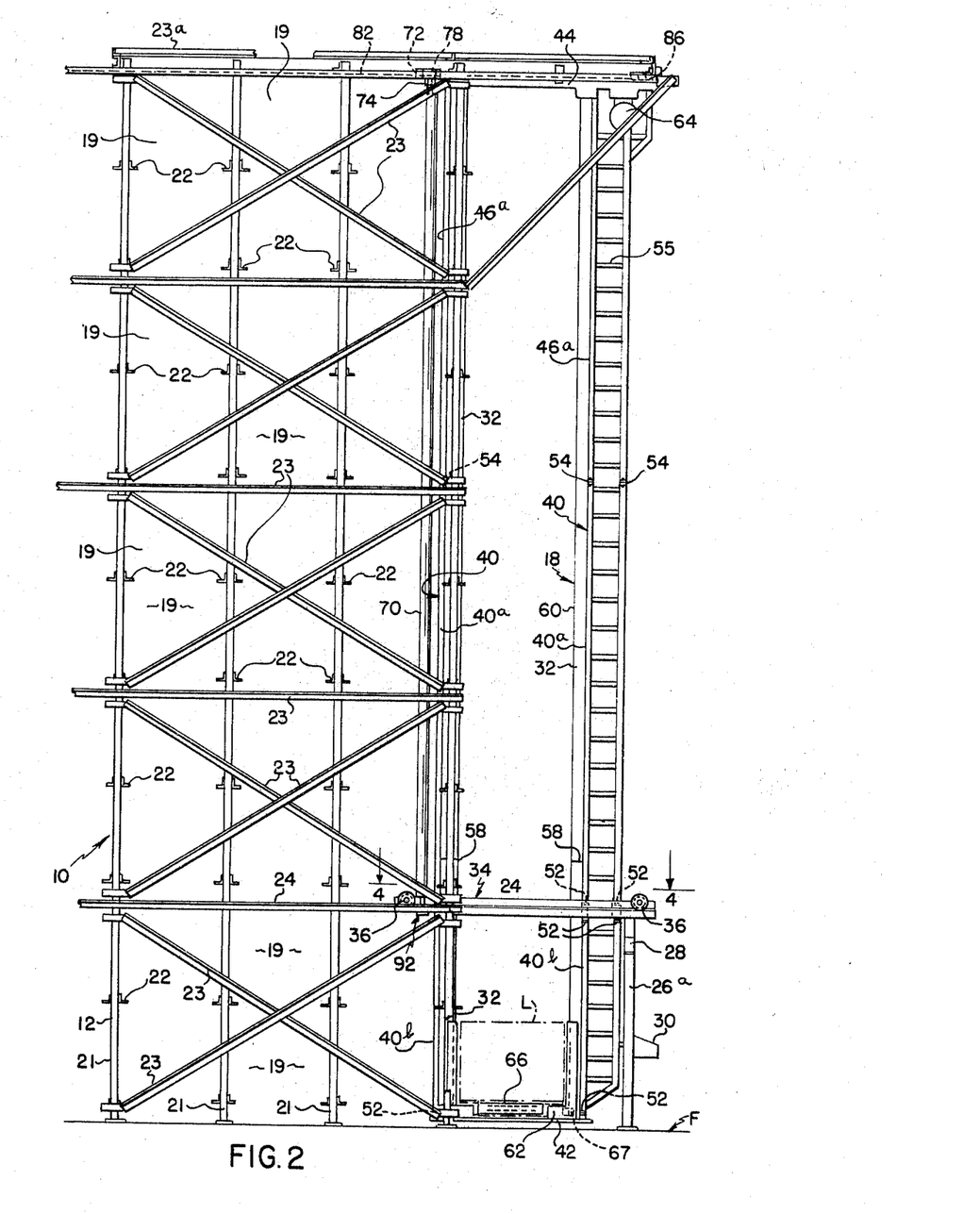
FIGURE 2 is a generally diagrammatic, fragmentary, side elevational view of the automatic warehousing system of FIGURE 1.
Figure 2:
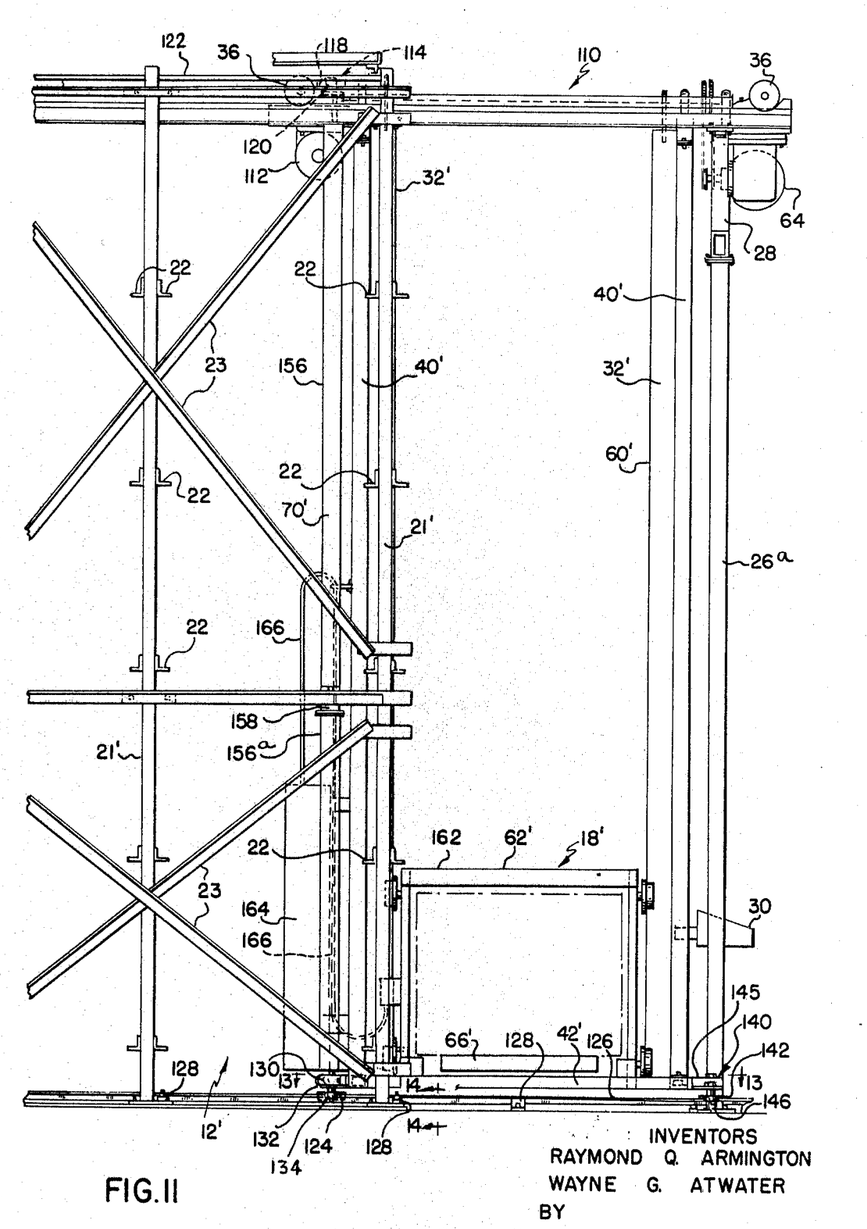

As can be best seen in FIGURES 1 and 2 of the drawings, carriage member 34 is disposed relatively close to the lower extremity of the load carrier, and preferably a distance from the floor level of approximately one-fifth to one-third of the total height of the load carrier. Such positioning of the load carrier support carriage 34 relatively close to the bottom extremity of the load carrier, together with the provision of the auxiliary support posts 26 underlying the rails 24 supporting the load carrier, materially aids in preventing flexure of the aisle posts 20, and both the aisle post members 20 and the back post members 21 are more equally loaded or stressed by the weight of the load carrier, thus providing for the use of back post members and aisle post members that are of the same cross sectional size.

In order to rigidify the mast structure of the load carrier there is provided truss or reinforcing means 40 which may be of fabricated construction, adjacent the forward and rearward ends of the carriage 34, with such truss means being secured to the carriage 34 and to the respective vertically extending track member 32. As can be seen FIGURE 1, such truss structure comprises upper sections 40a and lower sections 40b, and preferably extends for the full height of the load carrier. At its lower end, each truss section 40b is secured to a rectangular shaped (in the embodiment illustrated) frame 42, and at its upper end is secured to the carriage 34. Each truss section 40a at its lower end is secured to the carriage 34 and at its upper end is secured to a generally rectangular shaped (in the embodiment illustrated) frame 44 of a somewhat smaller size as compared to frame 42.

Each of the truss sections 40a and 40b comprises upstanding columns 46a, 46b, 46c, and diagonally extending cross members 50 coupling the columns 46a, 46b, 46c, together. Column 46b is secured to the respective vertical track member 32 by any suitable means, upon assembly of the load carrier at the warehousing location, and shims 52 are preferably provided at the juncture of the truss sections with the carriage 34 and at the juncture of the lower truss sections 40b with the lower frame 42, for enabling squaring of the front and rear truss sections with respect to the mast structure, prior to securing the truss sections to the respective mast and to the carriage 34. Truss structure 40 is preferably coupled to carriage 32 and the upper and lower frames 42, 44 by fastener means such as bolts 53. Upper truss sections 40a may be provided in sectional form as at 54 (FIGURE 1) to facilitate handling and assembly thereof. A ladder 55 may be suitably attached to the columns 46b of the rearwardly disposed truss structure 40, for enabling convenient accessibility to the carriage 34 and to the upper portion of the load carrier. Columns 46b of the rearward truss structure may be used as one of the side rails of the ladder. The track members 32 may be provided in sectional form and subsequently joined as at 58 upon assembly of the mast at the location of the warehousing system. The aforedescribed horizontally movable structure of the load carrier will be hereinafter referred to as conveyor mechanism or means 60.

Load carrier 18 includes a vertically movable elevator 62 adapted for vertical movement along the tracks 32 of the mast structure of conveyor mechanism 60, to the full height of the storage frame. Elevator 62 moves through the central opening in the carriage 34, as the elevator moves to the upper portion of the storage frame above carriage 34, and thus the elevator is unimpeded in its vertical movement. Suitable power means such as an electric motor 64 and associated lift mechanism of known construction may be carried at the upper end of the conveyor mechanism 60, with such motor and lift mechanism being operatively coupled to the elevator 62 in a known manner for actuating the elevator in its vertical movement.

Elevator 62 may include a load supporting platform or extractor 66 which preferably provides an extensible table, with such table being extendible in either of the opposed directions transverse to the direction of movement of the load carrier in the travel zone, so as to locate the table within the selected storage bin of either storage section 12 or 14, effective to place the extendible table in position to deposit or remove a load from the selected strage bins. Suitable power means such as an electric motor 67 operatively coupled to the extractor, may be provided for actuating the latter. Reference may be had to the aforementioned copending U.S. patent application Ser. No. 418,048 for a more detailed disclosure of such extendible extractor mechanism.

Since the conveyor mechanism 60 of the load carrier is of considerable height and since the load carrier support carriage 34 is disposed relatively close to the lower extremity of the load carrier, it will be seen that there is a tendency for both longitudinal and transverse pendulum-like movements of the load carrier about axes passing through the carriage 34, and thus a tendency for the load carrier to not remain in positive vertical aligned condition with respect to the storage frame, during movement of the load carrier in the travel zone. Alignment between the load carrier and the storage frame is necessary, as aforementioned, for enabling a load to be properly positioned in the storage frame or removed from the storage frame, during a load handling cycle of the load carrier. If misalignment between the load carrier and the storage frame exists during a load handling cycle, the extractor 66 will not be in proper position to move into the selected storage bin, and thus will not either properly place the load on the load supporting members 22 of the bin, or will actually engage defining portions of the storage bin, and cause damage either to the load carrier or to the storage frame.

In order to insure that the elongated load carrier is maintained in positive vertical alignment with the storage sections 12 and 14 and to prevent any pendulum or out-of-square movement of the load carrier, there may be provided in accordance with the invention a drive shaft 70 which extends from the vicinity of carriage 34 up to the upper portion of the load carrier. At its upper end shaft 70 is provided with a pinion gear 72 secured to the shaft. Bearing means 74 extending laterally outwardly from upper frame 44 may support the shaft 70 in depending relation from the load carrier. A plate or bracket 76 may be secured to upper frame 44 in laterally extending relation thereto with shaft 70 extending through such bracket and rotatable with respect thereto. Bracket 76 supports rotatable roller 78 thereon, the latter engaging in rolling coaction with the outer preferably flat side 80 of toothed rack 82. Rack 82 extends the length of the storage frame and may be secured to the underside of stringers 23a by any suitable means. Gear 72 is disposed in meshing relation with the rack teeth on the inner side of the rack, and thus couples the upper end of the conveyor means 60 to the storage frame. It will be seen therefore that the upper end of the shaft 70 is coupled in rigid condition—except for its rotary motion—with respect to the upper end of the load carrier. Rack 82 preferably has a lesser vertical thickness as compared to the thickness of the roller 78 and the thickness of pinion gear 72, so that the teeth of the pinion gear will positively engage the rack teeth, throughout the length of travel of the load carrier in the travel zone, and irrespective of slight dimensional differences between the top of the cross stringers 23a and the plane of the bottom of the rack.

Figure 3:
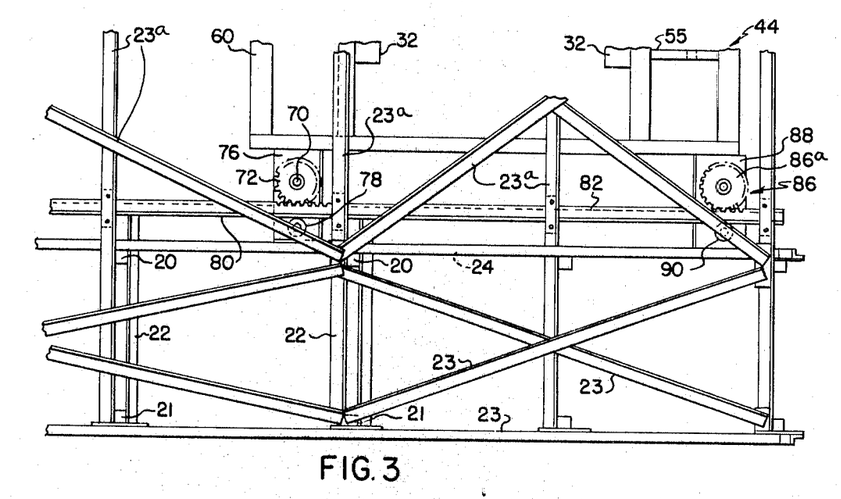
FIGURE 3 is a fragmentary, top plan view of the warehousing system of FIGURES 1 and 2, and illustrating in particular the upper end portion of the load carrier and its connection at one side thereof to the storage frame by gear and rack means, which is operative to square and guide the load carrier with respect to the storage frame.

As can be best seen in FIG. 3, the squaring shaft 70 is oriented adjacent the forward end of the load carrier and to one side thereof. There is also preferably provided adjacent the rearward end of the load carrier on the same side as the shaft 70, an idler guiding gear and roller assembly 86 which includes a pinion gear 86a rotatably mounted on a support 88 so as to engage in meshing relation with the teeth on the inner side of the rack 82 and, a roller 90 spaced outwardly from the gear 86a and adapted to engage the outer side of the rack. It will be seen therefore that the upper end of the load carrier is positively prevented from moving in a direction transverse of the travel zone.

At the bottom end of the squaring shaft 70 there is provided a gear and roller assembly 92 (FIGS. 1, 7, 8 and 9) with such assembly being secured in floating relation to the load carrier, so that assembly 92 can move with respect to the load carrier in a generally horizontal plane substantially transverse to the longitudinal direction of movement of the load carrier.

Gear 92a of assembly 92 is secured to the lower end of the shaft 70, and engages in meshing relation with the inner side teeth of a gear rack 94 which extends lengthwise of the aisle and which may be supported in depending relation from inwardly extending plates 96 (FIGS. 4 and 9) supporting the associated rail 24. Lower gear and roller assembly 92 may comprise bracket 98 which supports a bearing 100 thereon in which is rotatably mounted the lower end of the squaring shaft 70. A roller 102 may be mounted on the bracket 98 in laterally spaced relation to the pinion 92a, for rolling engagement with the outer side of rack 94. Bracket 98 may be movably coupled to the load carrier by means of U-shaped (in side elevation) pivots 104 (FIGURE 8) which receive a bar member 106 pivoted as at 106a to the respective U-shaped pivot and as at 106b to the load carrier.

The bearing 100 is preferably adjustably secured to the bracket 98, and in this connection there may be provided set screws 108 (FIGURES 7 and 8) adapted to extend into abutting relationship with the lateral ends of the bearing, so as to properly position it with respect to the bracket prior to tightening of the fastener means 110. The bearing 100 and associated pinion gear 92a are adapted to be initially so positioned with respect to the bracket 98 and the rack 94 so that the bar-like members 106 are parallel with the rack when the carriage wheels 36, 36a are in centered relationship with the longitudinal vertical center plane of the respective rail member 24. It will be seen therefore that while the upper end of the squaring shaft 70 is rigidly coupled to the load carrier the lower end thereof is movably mounted with respect to the load carrier, so that it can move transversely of the direction of movement of the load carrier in the travel zone.

It will be seen that as the load carrier moves horizontally in the aisle to either deposit a load into or remove a load from the storage sections, and as driven by the motor unit 38 on the carriage 34, movement of the carriage will cause rotation of the gear 92a of the lower gear and roller assembly, which as aforedescribed is floatingly mounted with respect to the load carrier 18, thus causing rotation of the shaft 70, which in turn causes rotation of the pinion gear 72 on the upper gear and roller assembly. Gears 72 and 92a are of the same size and coact with the same size of rack, and thus the upper end of the load carrier is moved along at the same velocity as that of the carriage 34. Accordingly, the load carrier is maintained in perfect aligned vertical condition with respect to the aisle posts of the storage frame sections 12 and 14. The truss structure 40 associated with each of the tracks of the mast prevents flexure of the load carrier during movement of the load carrier and in conjunction with the rigid coupling of the upper end of the squaring shaft 70 to the upper fixed rack 82 and to the load carrier, insures that the load carrier is maintained in positive vertical and aligned relationship with respect to the posts of the storage frame sections. Moreover, locating the horizontally movable carriage 34 near the bottom of the load carrier while at the same time maintaining the vertical alignment of the mast structure of the load carrier with the storage frame posts, provides for the rigid extension of the mast structure below the carriage 34 with the effect of fixed supports on the upper portions of the mast structure, thereby giving rigidity to the lower portions of the mast structure in a plane parallel to the work faces of the storage frame sections 12 and 14. Accordingly, operation of the load carrier to properly locate the extractor 66 in centered position in front of the selected bin in the selected storage section to deposit or remove a load therefrom may be expeditiously accomplished.

It will be understood that vertical alignment of the load carrier with the aisle posts of the storage frame sections is not essential during longitudinal movement of the load carrier in the travel zone, but is only necessary during operation of the extractor 66 in its lateral movements to deposit and/or retrieve loads from the storage frame sections.

Referring now to FIGURES 10 through 14, there is shown another embodiment of automatic warehousing system wherein the load carrier carriage 110 instead of being supported at the lower portion of the storage frame sections is supported at the upper portions of the storage frame sections. This particular arrangement of warehousing system is adapted for use in installations of a lesser height than the height of the installations of the first described embodiment, since positioning of the load carrier at the upper end of the storage frame sections applies considerable flexure stress to the posts (20', 21') of the storage frame sections. For instance, this arrangement may be expeditiously utilized in installations of approximately 15 feet to 30 feet in height.

Figure 10:
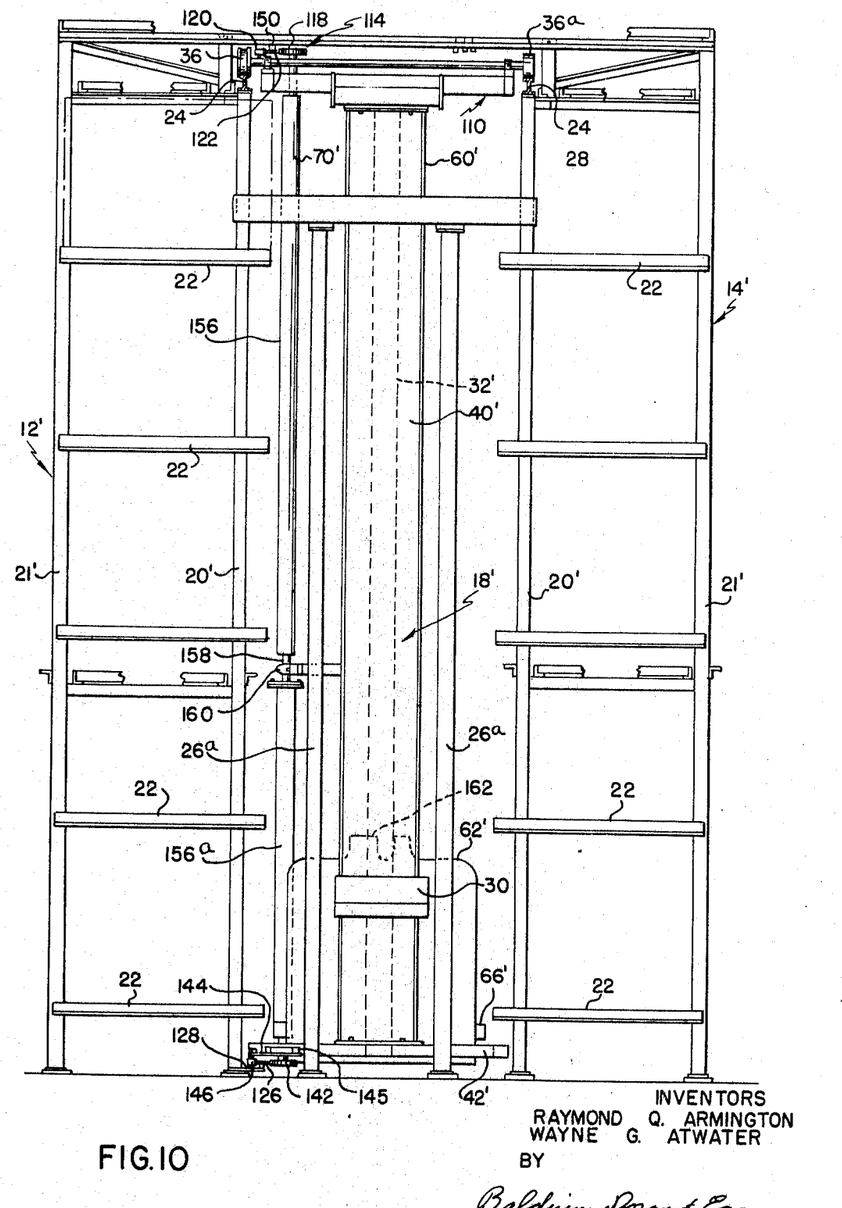
FIGURE 10 is a generally diagrammatic end elevational view of a modified form of automatic warehousing system.
Figure 12:
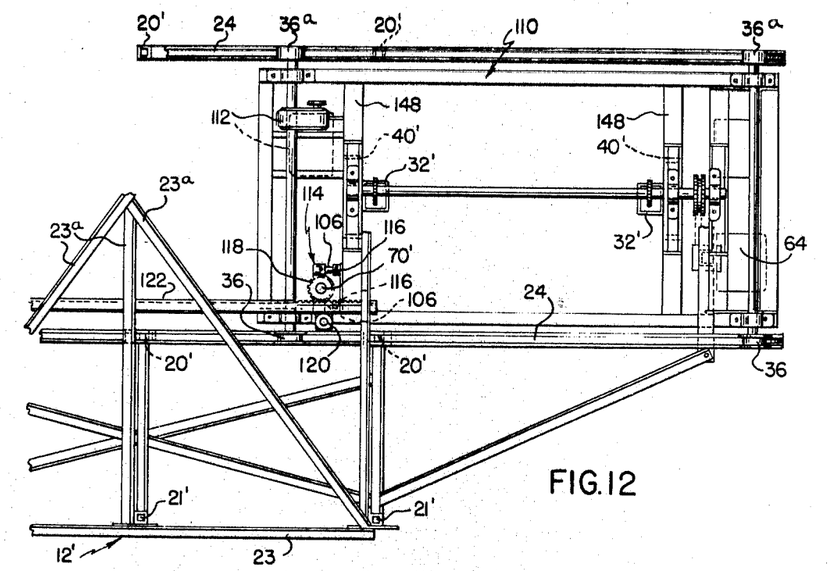
FIGURE 12 is a fragmentary top plan view of the FIGURE 11 illustration, and particularly illustrating the horizontally movable support carriage of the load carrier, which carriage is disposed at the top of the warehousing system.
Figure 13:
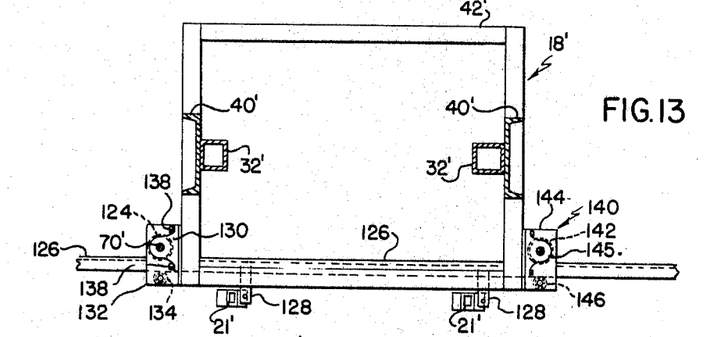
FIGURE 13 is a sectional view taken generally along the plane of line 13—13 of FIGURE 11, looking in the direction of the arrows.

As can be seen in FIGURE 10, the rail members 24 are supported on the aisle posts 20' and the rails in turn support the wheeled carriage 110 thereon for movement horizontally with respect to the storage bay sections, thereby moving the conveyor mechanism 60' of the load carrier 18' in the aisle for depositing a load into or retrieving a load from the storage frame. The carriage frame 110 may be power driven as at 112 similarly to the first described embodiment of the invention. A floating gear and roller assembly 114 may be pivoted as at 116 to the carriage 110, with the gear 118 of assembly 114 being secured to the squaring shaft 70' adjacent the upper end of the latter. Assembly 114 may be of generally similar construction as floating gear assembly 92 of the first described embodiment, and includes roller 120 engaging the outer side of gear rack 122 with gear 118 meshing with the inner toothed side of rack 122. The gear 124 may be secured to the shaft 70' adjacent the latter's bottom extremity with such gear disposed in meshing relation with lower rack 126 secured as by means of bracket structure 128 to the storage frame section 12'. Bearing means 130 may coact with the lower end of the squaring shaft 70' and is secured to the lower frame 42' (FIGURE 13) of the load carrier. Bearing 130 supports shaft 70' on the load carrier in rotatable relation thereto, but prevents horizontal movement of the shaft with respect to the load carrier. Bracket 132 may rotatably mount roller 134 thereon, with the latter engaging in rolling relation with the outer side of rack 126. Bracket 132 may be secured to frame 42' as by means of fasteners 138 with shaft 70' passing through bracket 132 in rotatable relation.

The lower frame 42' of the load carrier also preferably embodies an idler gear and roller assembly 140 (FIGURES 11 and 13) at the rearward end thereof, including pinion gear 142 which meshes with the toothed rack 126 for guiding the load carrier 18' in its movement alongside the storage frame sections. Assembly 140 may include bracket 144 secured to frame 42', bearing 145 for the gear 142, and roller 146 mounted on bracket 144 and engaging the outer side of rack 126 in rolling relation.

The truss means 40' in this embodiment comprises channel-shaped members extending for the full height of the load carrier, and being secured at their bottom ends to the lower frame 42' of the load carrier, and at the top ends thereof to cross members 148 of the load support carriage 110. Each truss member 40' is also secured to the associated track member 32' throughout its length, by any suitable means, such as, for instance welds.

Figure 14:
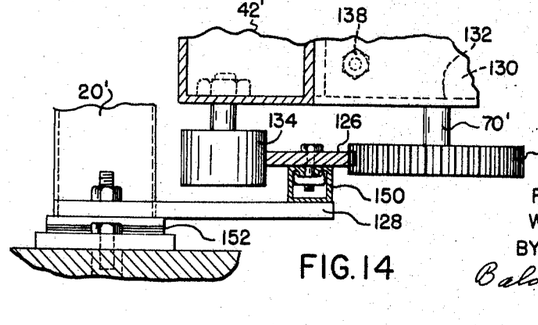
FIGURE 14 is an enlarged sectional view taken along the plane of line 14—14 of FIGURE 11, looking in the direction of the arrows.

As can be best seen in FIGURES 10 and 14, the toothed racks 122, 126 are preferably of a lesser depth as compared to the depth of both the associated gear 118 or 124 and the respective backup roller 120 or 134, and may be mounted by means of a channel-shaped member 150 to the supporting storage frame. Brackets 128 mounting the lower gear rack 126 extend inwardly into the aisle and are preferably provided with shims 152 (FIGURE 14) so as to provide for readily adjusting the vertical position of the rack 126 with respect to floor level.

As shown in FIGURE 11, the squaring shaft 70' may be of a sectional construction including upper section 156 and lower section 156a, and which may include a reduced diameter section 158 at the coupling of the upper section 156 to the lower section 156a. Reduced diameter section 158 may coact with a bearing 160 (FIGURE 10) supported on the conveyor mechanism 60' of the load carrier, for guiding the rotation of the squaring shaft with respect to the load carrier during movement of the latter in the travel zone.

In this embodiment, the elevator 62' may include cross members 162 rigidly anchoring the side walls of the elevator together into an integral unit. There may also be provided an electrical box 164 mounted on the horizontally movable conveyor mechanism 60' for housing various components of the electrical control circuitry for controlling the movement of the load carrier in its cycling action for depositing and/or retrieving loads from the storage bays. Box 164 may be connected to the vertically movable elevator 62' by flexible electrical cable 166. It will be understood that the elevator 62 of the first described embodiment could of course be of the same general type as that of the FIGURES 11 to 14 embodiment, rather than the type illustrated, without departing from the scope of the invention.

In other respects, the FIGURES 11 to 14 embodiment may be generally similar to that of the first described embodiment.

From the foregoing description and accompanying drawings it will be seen that the invention provides a novel automatic warehousing system including a powered, vertically extending load carrier which embodies means for rigidifying the load carrier against flexure and for maintaining vertical alignment of the load carrier with the storage frame. The invention also provides a warehousing system of the latter type wherein such means includes spaced driven gear and roller assemblies mounted on the load carrier and coacting with toothed rack means on the storage frame, so that the load carrier is driven horizontally at a plurality of vertically spaced locations thereon, thus preventing misalignment of the load carrier with respect to the storage bins of the storage frame.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

We claim:

1. In a warehousing system comprising a plurality of vertically and horizontally oriented storage means having open load receiving ends with there being a travel zone alongside of said storage means and a powered load carrier movable in said travel zone, said load carrier comprising conveyor means movable generally horizontally in said travel zone, elevator means movable generally vertically on said conveyor means, and extractor means on said elevator means adapted for movement transversely of said travel zone into selected of said storage means for either depositing a load into or removing a load from said storage means, said conveyor means comprising a carriage for mounting the load carrier on said storage means, means on said storage means supporting said carriage on said storage means and guiding said carriage for generally horizontal movement, said conveyor means also including vertically elongated mast structure secured to said carriage and extending vertically therefrom, said mast structure providing for said vertical movement of said elevator means on said conveyor means, power means for driving said carriage to cause said horizontal movement of said load carrier in said travel zone, vertically spaced aligning assemblies on said load carrier and vertically spaced aligning means on said storage means coacting with the respective aligning assembly on said load carrier, each of said aligning assemblies comprising a rotatable aligning means coacting with one side of the respective aligning means on said storage means, said rotatable aligning means being connected to one another by vertical shaft means rotatable with respect to said load carrier, said vertically spaced rotatable aligning means and connecting shaft means being responsive to said horizontal movement of said carriage for causing concurrent horizontal movement of said elongated mast structure with movement of said carriage to maintain vertical alignment of said load carrier with said storage means, thus ensuring that said extractor means will be in proper position with respect to the vertically oriented storage means for inserting or removing a load from the selected storage means, each of said aligning assemblies on said load carrier including a rotatable idler roller means coacting with the opposite side of the respective aligning means on said storage means for maintaining the respective rotatable aligning means of each aligning assembly in coacting relation with the respective aligning means on the storage means, and means movably mounting one of said aligning assemblies for movement with respect to said load carrier in a generally horizontal plane and generally transverse of the direction of movement of said carriage lengthwise of said travel zone, to provide generally horizontal floating action for said one aligning assembly with respect to said carriage, the last mentioned means comprising horizontally elongated means and vertical pivot means coupling said horizontally elongated means to said carriage.

2. A warehousing system in accordance with claim 1 including means coacting between said carriage and said mast structure and rigidifying said mast structure with respect to said carriage, the last mentioned means extending for substantially the full height of said load carrier.

3. A warehousing system in accordance with claim 2 wherein said mast structure comprises a pair of columns disposed adjacent the forward and rearward ends of said carriage in generally central relationship with respect thereto in directions transverse of said carriage, and wherein said means rigidifying said mast structure comprises reinforcing means coacting with each of said columns and being secured thereto and to said carriage, said reinforcing means extending for substantially the full height of said mast structure.

4. A warehousing system in accordance with claim 1 wherein said storage means comprises spaced storage bays defining said travel zone therebetween, said storage bays each mounting a carriage supporting means thereon, each of said carriage supporting means comprising an elongated generally horizontally disposed track fixed to the respective storage bay, said tracks being laterally disposed with respect to one another in the same horizontal plane, said carriage bridging said travel zone and being supported for horizontal movement lengthwise of said travel zone on said laterally spaced tracks, and said carriage including wheel means on the sides of said carriage coacting with the respective track.

5. A warehousing system in accordance with claim 4 wherein said wheel means on one side of said carriage include laterally spaced flanges for lateral guiding coaction with the respective of said tracks, the wheel means on the opposite side of said carriage being substantially cylindrical whereby no lateral guiding of the last-mentioned wheel means occurs.

6. A warehousing system in accordance with claim 1 wherein said carriage supporting means on said storage means is disposed adjacent the upper end of said storage means, and said mast structure is supported in depending relation from said carriage and extends downwardly into said travel zone.

7. A warehousing system in accordance with claim 1 wherein said carriage supporting means is disposed intermediate the upper and lower extremities of said storage means and supports said carriage thereon below the horizontal center plane of said conveyor means with said mast structure extending above and below said carriage.

8. A warehousing system in accordance with claim 1 wherein said carriage is disposed a distance from floor level of approximately one-fifth to one-third of the total height of said load carrier.

9. A warehousing system in accordance with claim 3 wherein said mast structure includes horizontally oriented frames secured to the upper and lower ends thereof, and wherein said reinforcing means comprises upper and lower sections terminating at said carriage, means securing said upper and lower sections to said carriage and to said upper and lower frames, and shim means for adjusting the position of said sections with respect to said carriage.

10. A warehousing system in accordance with claim 1 wherein said vertically spaced rotatable aligning means comprise gears and said vertically spaced aligning means on said storage means comprise toothed racks coacting with the respective gear.

References Cited

UNITED STATES PATENTS

| | | | |
|---|---|---|---|
| 951,698 | 3/1910 | Poole | 187—95 X |
| 1,676,161 | 7/1928 | Schiller et al. | 187—95 X |
| 1,779,998 | 10/1930 | Beecher et al. | |
| 2,667,983 | 2/1954 | Billings. | |
| 2,816,624 | 12/1957 | Asheim et al. | |
| 3,132,753 | 5/1964 | Chasar et al. | 214—16.4 |
| 3,302,750 | 2/1967 | Arnold | 187—95 |
| 3,132,753 | 5/1964 | Chasar et al. | 214—16.4 |
| 3,329,240 | 7/1967 | Harwood et al. | 187—95 |

FOREIGN PATENTS

| | | |
|---|---|---|
| 229,880 | 8/1960 | Australia. |
| 750,793 | 6/1956 | Great Britain. |
| 337,726 | 10/1930 | Great Britain. |

GERALD M. FORLENZA, Primary Examiner

RAYMOND B. JOHNSON, Assistant Examiner

U.S. Cl. X.R.

187—7